G. W. NICHOLS.
Machine for Trimming Lumber.
No. 206,962.  Patented Aug. 13, 1878.
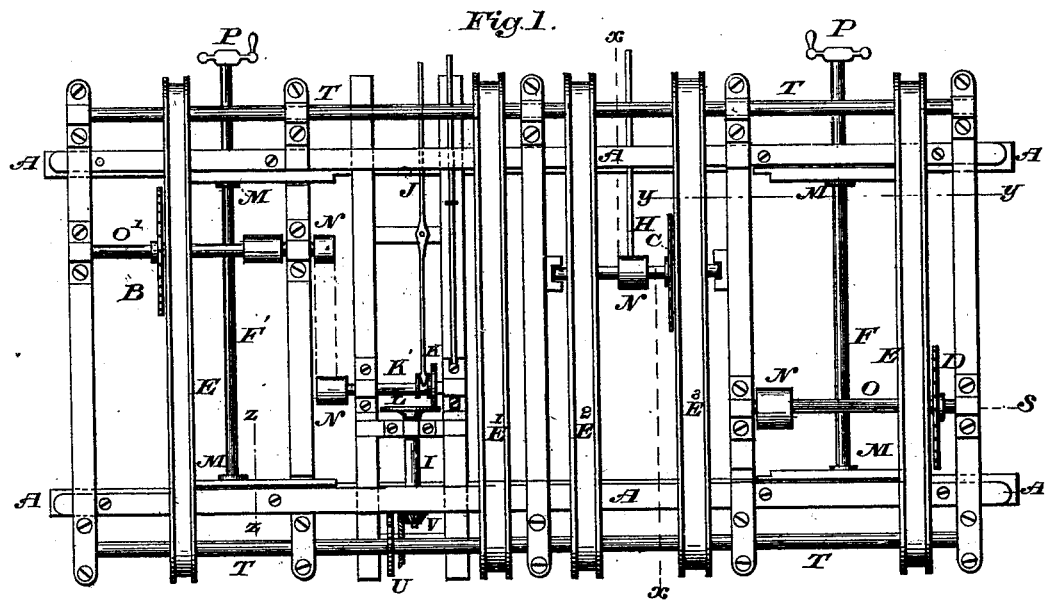
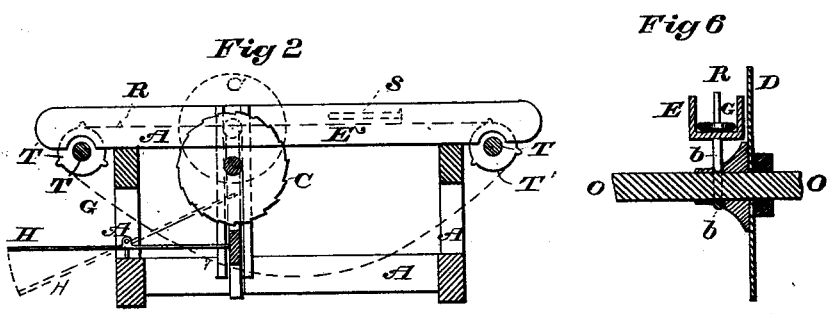
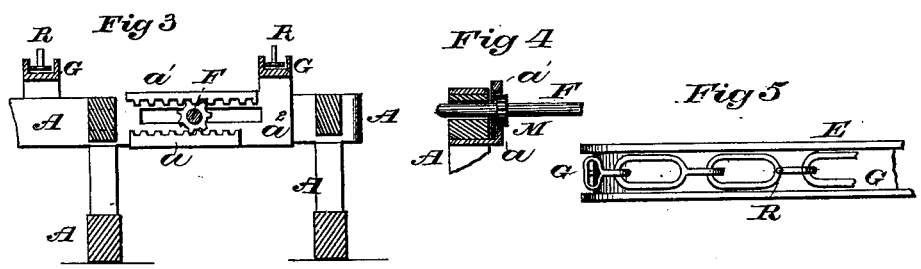
Witnesses:
G. B. Towles
H. A. Daniels
Inventor:
George W. Nichols
By W. Burris
Attorney

UNITED STATES PATENT OFFICE

GEORGE W. NICHOLS, OF CLINTON, IOWA.

IMPROVEMENT IN MACHINES FOR TRIMMING LUMBER.

Specification forming part of Letters Patent No. 206,962, dated August 13, 1878; application filed July 25, 1877.

*To all whom it may concern:*

Be it known that I, GEORGE WASHINGTON NICHOLS, of Clinton city, in the county of Clinton and State of Iowa, have invented certain new and useful Improvements in Lumber-Trimming Machines; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1 is a plan view, showing the races without the carrying-chains. Fig. 2 is a transverse view on line $x\ x$ of Fig. 1. Fig. 3 is a longitudinal vertical section on line $y\ y$ of Fig. 1. Fig. 4 is a transverse section on line $z\ z$ of Fig. 1. Fig. 5 is a plan view of a portion of one of the races with the carrying-chain enlarged. Fig. 6 is a vertical longitudinal section on line $s$ of Fig. 1.

My invention relates to that class of lumber-trimming machines which cut the lumber to a uniform length; and the particular object of the invention is to provide a machine to cut the lumber square at the ends, and one end at a time, and will hold the lumber while being cut, so that it will not tremble or swing around or pinch the saw, as hereinafter described.

In the drawings, A represents the frame of the machine, upon which are arranged, on proper arbors, the saws B C D. E E $E^1$ $E^2$ $E^3$ are races or guides for the carrying-chains and rests for the lumber. F F represent shafts, provided with hand-wheels P, and with pinions M, adjusted to travel in fixed racks $a$ attached to the frame and in racks $a^1$ on guide-plates $a^2$ attached to the end guides E, as shown in Figs. 1 and 3 of the drawings, for adjusting laterally the end guides and saws. G represents the carrying-chains, which are provided with lugs $R$, at right angles to the face of the chains. H is a lever pivoted to the frame, and connected at the inner end to a vertically-sliding frame, upon which is mounted the saw C. J is a lever pivoted to the frame, and connected at the inner end to the friction feed-wheel K, adjusted to slide back and forth on the feathered shaft K', for regulating the feed and operating the wheel L on shaft I, connected with the gearing which operates the carrying-chains. The feed of the lumber to the saws is regulated by the adjustment of the wheel K, which is moved outward to increase the feed and inward toward the center of wheel L to lessen the feed.

N represents pulleys on the arbors of the saws and of the wheel K. The saw-arbors O O' are provided with splines fitting in grooves in the hubs of the saws B D, which are adjusted to slide back and forth on their arbors.

T represents shafts, having their bearings on the frame, and provided with sprocket-wheels T' for operating the carrying-chains. The end guides E and their sprocket-wheels are adjusted to slide back and forth on the shafts T, which are provided with splines fitting in grooves in the sprocket-wheels.

The hubs of the saws B D are provided with grooves to receive pins $b$ attached to the guides E, as seen in Fig. 6 of the drawings, for connecting the end guides and saws together, so that they may be adjusted laterally together for the purpose of keeping these end guides and their carrying-chains always close to the saws, to prevent the springing and trembling of the lumber while in cut.

The saws are arranged on separate arbors on the machine, to cut the lumber at right angles to the edge or side resting against the lugs on the chains; and the saw B is placed on the machine in front of the saw D, so that one end of the lumber may be cut at a time, to prevent the pinching of the saws, which often occurs when both ends of the lumber are cut at the same time.

The end guides and saws being adjusted laterally in position for cutting the lumber the required length, and the lumber placed on the machine in front of the saw B, the lugs on the chains move the lumber against that saw, which cuts one end, and then against saw D, which cuts the other end of the lumber, which is then moved off the machine.

When the lumber is to be cut shorter than can be conveniently cut by the saws B D, the saw C is raised by the lever H into position for cutting, as shown by dotted lines in Fig. 2 of the drawings.

What I claim, and desire to secure by Letters Patent, is—

1. A machine for trimming lumber having guide-rests E, with their carrying-chains, in combination with saws B D, connected to the guide-rests and adjustable laterally with the saws, substantially as and for the purposes described.

2. The accommodation-saw C, mounted on a vertically-sliding frame, in combination with the saws B D, substantially as and for the purposes described.

3. The feed devices J K K' L, in combination with the adjustable saws B D, arranged on separate arbors, one ahead of the other, substantially as and for the purposes described.

In testimony that I claim the foregoing as my own invention I hereto affix my signature in presence of two witnesses.

GEORGE WASHINGTON NICHOLS.

Witnesses:
H. R. MURDOCK,
F. V. COMFORT.